US012811912B2

(12) United States Patent
Vallabhaneni et al.

(10) Patent No.: US 12,811,912 B2
(45) Date of Patent: Nov. 24, 2026

(54) CONTEXT BASED RESOLUTION FOR VIRTUAL PRIVATE CLOUDS IN A HUB AND SPOKE MODEL

(71) Applicant: International Business Machines Corporation, Armonk, NY (US)

(72) Inventors: Vasu Vallabhaneni, Austin, TX (US); Niraj Patel, Round Rock, TX (US); James K. Wong, Austin, TX (US); Andrei Vinh Cong Ta, Pflugerville, TX (US); Nikhil Gupta, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 13 days.

(21) Appl. No.: 18/781,702

(22) Filed: Jul. 23, 2024

(65) Prior Publication Data

US 2026/0032104 A1 Jan. 29, 2026

(51) Int. Cl.
*H04L 29/00* (2006.01)
*H04L 9/40* (2022.01)

(52) U.S. Cl.
CPC ................................ *H04L 63/0272* (2013.01)

(58) Field of Classification Search
CPC .................................................. H04L 63/0272
See application file for complete search history.

(56) References Cited

U.S. PATENT DOCUMENTS

| | | | |
|---|---|---|---|
| 7,463,584 B2 | 12/2008 | Allan et al. | |
| 9,319,300 B2 | 4/2016 | Huynh Van et al. | |
| 10,356,038 B2 | 7/2019 | Sharma et al. | |
| 10,958,734 B2 | 3/2021 | Laibson | |
| 11,223,685 B2 | 1/2022 | Laibson | |
| 11,252,126 B1 * | 2/2022 | Thunga | H04L 45/48 |
| 11,405,423 B2 | 8/2022 | Narayanaswamy et al. | |
| 11,647,079 B2 | 5/2023 | Laibson | |
| 12,363,073 B1 * | 7/2025 | Vannarath | H04L 63/0263 |
| 2018/0351904 A1 | 12/2018 | Mizik et al. | |
| 2021/0168056 A1 * | 6/2021 | Qian | H04L 41/0803 |
| 2022/0207143 A1 | 6/2022 | Burdett et al. | |
| 2025/0126043 A1 * | 4/2025 | Tang | H04L 45/02 |

OTHER PUBLICATIONS

Vmware, "VMware Cloud on AWS Operations Guide," SDDC Version 1.22, VMware Cloud on AWS, Jul. 5, 2023, 161 pages.

(Continued)

*Primary Examiner* — Jeffrey C Pwu
*Assistant Examiner* — Helai Salehi
(74) *Attorney, Agent, or Firm* — Harrity & Harrity, LLP

(57) ABSTRACT

A computer-implemented method (CIM), according to one embodiment, includes creating virtual private endpoints (VPEs) for service endpoints for virtual private clouds (VPCs) of a cloud network, and creating, for the VPCs, buckets having names that include VPC identifiers (IDs). In response to receiving, from a first of the VPCs, a first query for a first of the service endpoints, a name included within the first query is caused to be used for parsing for one of the buckets, where the parsing identifies a first of the buckets. The CIM further includes causing a VPC ID to be extracted from the first bucket, and using the extracted VPC ID as context for resolving the first query.

9 Claims, 6 Drawing Sheets

(56) References Cited

OTHER PUBLICATIONS

Anonymous, "Method and System for Provisioning Fast Virtual Network Interface Component (VNIC) in a Virtual Private Cloud," Prior Art Database, Technical Disclosure No. IPCOM000258508D, May 17, 2019, 4 pages.
Anonymous, "Policy-Based Automated Secrets Management Applied to Distributed Cloud Infrastructure," Prior Art Database, Technical Disclosure No. IPCOM000272009D, Mar. 23, 2023, 10 pages.
Anonymous, "Method and Apparatus for Discovery Protocol for Multicloud Architecture," Prior Art Database, Technical Disclosure No. IPCOM000270862D, Sep. 2, 2022, 6 pages.
Anonymous, "Method and System for Migrating Workload from Private to Public Cloud and Vice Versa," Prior Art Database, Technical Disclosure No. IPCOM000259244D, Jul. 22, 2019, 3 pages.
Wikipedia, "Virtual private cloud," Wikipedia, 2024, 2 pages, retrieved from https://en.wikipedia.org/wiki/Virtual_private_cloud.

* cited by examiner

CONTEXT BASED RESOLUTION FOR VIRTUAL PRIVATE CLOUDS IN A HUB AND SPOKE MODEL

BACKGROUND

The present invention relates to cloud networks, and more specifically, this invention relates to hub and spoke models within cloud networks.

Within a cloud network, network resources are hosted in a public or private cloud. These resources may be managed by service providers, e.g., such as service providers that manage the upload and storage of user data that is thereafter accessible to owners of the user data upon request.

SUMMARY

A computer-implemented method (CIM), according to one embodiment, includes creating virtual private endpoints (VPEs) for service endpoints for virtual private clouds (VPCs) of a cloud network, and creating, for the VPCs, buckets having names that include VPC identifiers (IDs). In response to receiving, from a first of the VPCs, a first query for a first of the service endpoints, a name included within the first query is caused to be used for parsing for one of the buckets, where the parsing identifies a first of the buckets. The CIM further includes causing a VPC ID to be extracted from the first bucket, and using the extracted VPC ID as context for resolving the first query.

A computer program product (CPP), according to another embodiment, includes a set of one or more computer-readable storage media, and program instructions, collectively stored in the set of one or more storage media, for causing a processor set to perform the foregoing method.

A computer system (CS), according to another embodiment, includes a processor set, a set of one or more computer-readable storage media, and program instructions, collectively stored in the set of one or more storage media, for causing the processor set to perform the foregoing method.

Other aspects and embodiments of the present invention will become apparent from the following detailed description, which, when taken in conjunction with the drawings, illustrate by way of example the principles of the invention.

DETAILED DESCRIPTION

Figure 1:
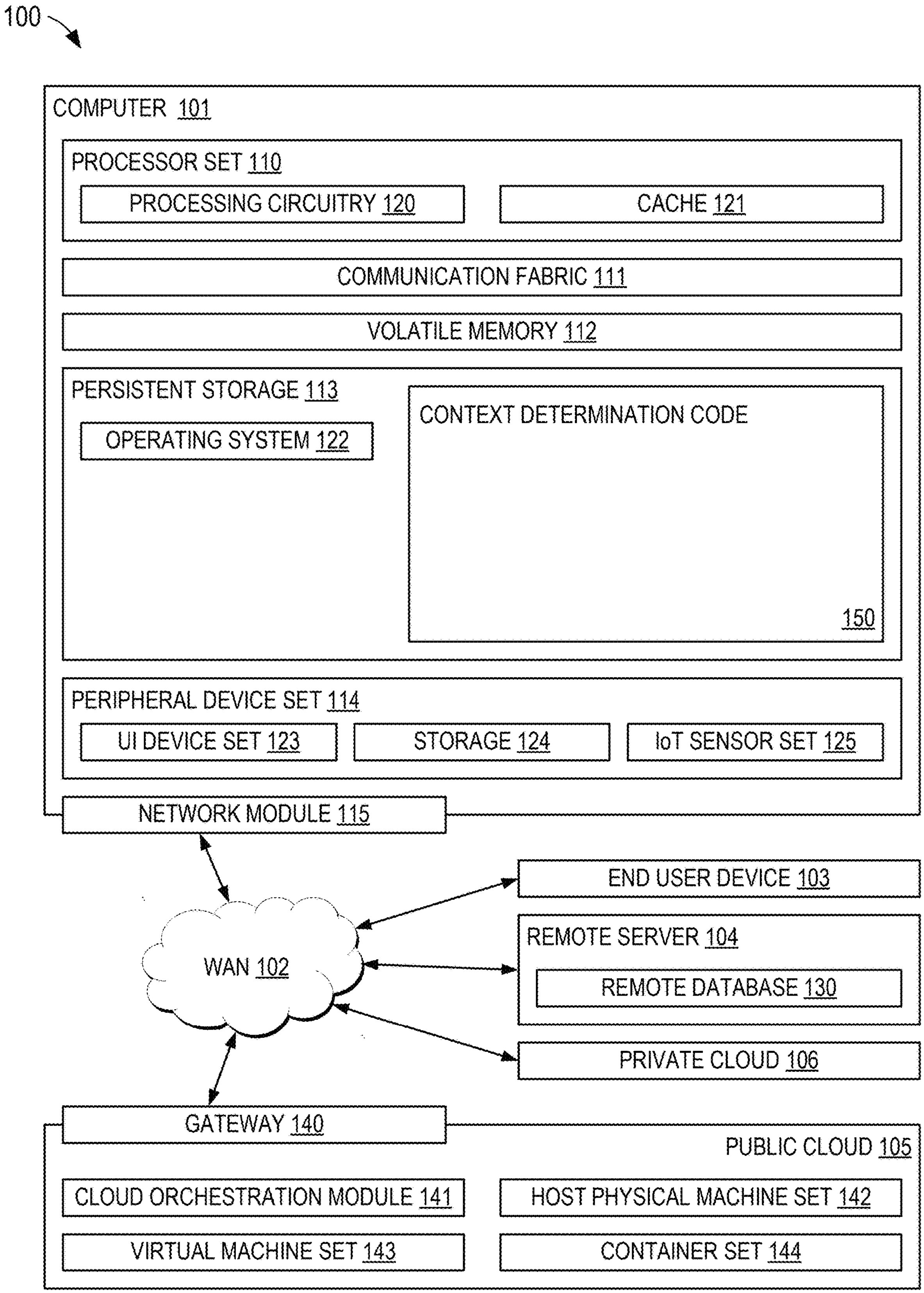
FIG. 1 is a diagram of a computing environment, in accordance with one embodiment of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for context based resolution for virtual private clouds in a hub and spoke model.

In one general embodiment, a CIM includes creating virtual private endpoints (VPEs) for service endpoints for virtual private clouds (VPCs) of a cloud network, and creating, for the VPCs, buckets having names that include VPC identifiers (IDs). In response to receiving, from a first of the VPCs, a first query for a first of the service endpoints, a name included within the first query is caused to be used for parsing for one of the buckets, where the parsing identifies a first of the buckets. The CIM further includes causing a VPC ID to be extracted from the first bucket, and using the extracted VPC ID as context for resolving the first query.

In another general embodiment, a CPP includes a set of one or more computer-readable storage media, and program instructions, collectively stored in the set of one or more storage media, for causing a processor set to perform the foregoing method.

In another general embodiment, a CS includes a processor set, a set of one or more computer-readable storage media, and program instructions, collectively stored in the set of one or more storage media, for causing the processor set to perform the foregoing method.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as context determination code of block 150 for context based resolution for virtual private clouds in a hub and spoke model. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertiontype connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size). Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various embodiments.

Figure 2:
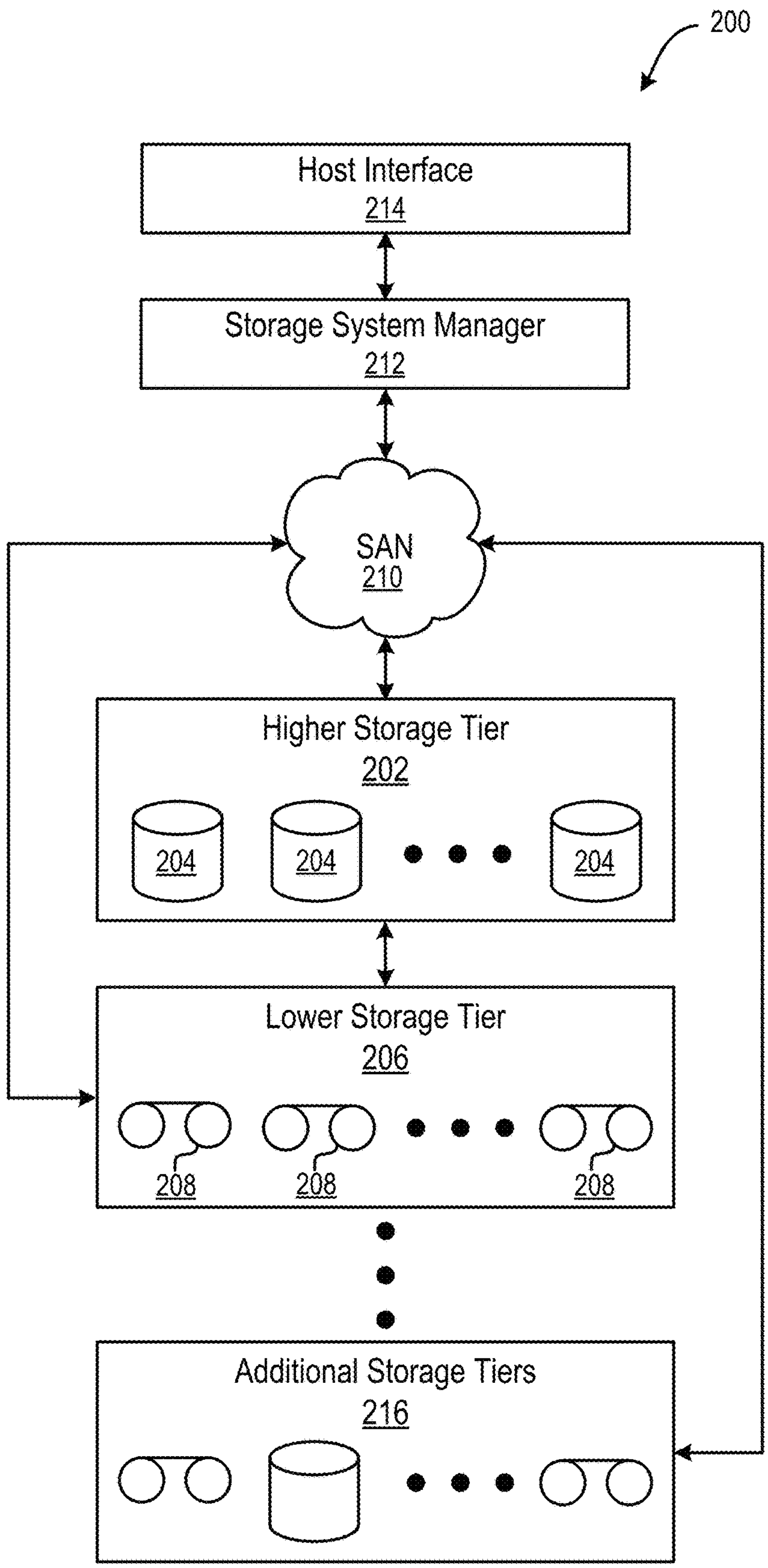
FIG. 2 is a diagram of a tiered data storage system, in accordance with one embodiment of the present invention.

Now referring to FIG. 2, a storage system 200 is shown according to one embodiment. Note that some of the elements shown in FIG. 2 may be implemented as hardware and/or software, according to various embodiments. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a SAN, as shown in FIG. 2, Internet Protocol (IP) network, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the embodiments presented herein.

According to some embodiments, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

As mentioned elsewhere above, within a cloud network, network resources are hosted in a public or private cloud. These resources may be managed by service providers, e.g., such as service providers that manage the upload and storage of user data that is thereafter accessible to owners of the user data upon request.

Typical cloud providers providing a solution make regional endpoints available, which may be accessible publicly or privately by a user's host. In some approaches, users may interact with user data using these endpoints.

It should be noted that the cloud infrastructure described herein may be any type of infrastructure that would become apparent to one of ordinary skill in the art after reading the descriptions herein. For example, in some approaches, the infrastructure described herein may be AMAZON SIMPLE STORAGE SERVICE (Amazon S3).

User devices may be used to deploy workloads in a hub and spoke model. Such a model may include one or more virtual private clouds (VPCs). For context, a VPC may be an on-demand configurable pool of shared resources that are allocated within a public cloud environment. The VPCs are used to establish a virtual barrier between different users of the resources of the cloud environment. Within a hub and spoke model, there may be one virtual private cloud (VPC) that is the hub, and there are multiple other VPCs that are spokes. These VPCs may be networked together in a way that would effectively merge multiple VPC's subnets into one, e.g. through a transit gateway. At minimum, each spoke VPC's network may be merged with the hub VPC's, e.g., one transit gateway for each spoke-hub pair. When the model is in use, critical categories of network traffic from a spoke VPC typically flow to, and are proxied by, the hub VPC, e.g., for security, ease of management, and/or other possible reasons. Domain name system (DNS) traffic, which is an exchange of queries and responses between devices and DNS servers, is one of such critical categories of such traffic.

In some approaches, each VPC may have their own virtual private endpoint (VPE) gateway providing a private data connectivity from clients of the given VPC to a desired service on a cloud provider, e.g., an S3 solution. A VPE hostname points to this gateway. This VPE may be implemented by a DNS resource record with a wildcard hostname for an availability zone, region, etc. geographic location level, and is known to and accessible only by the owning VPC through a private zone. Such private resource records in a private zone are resolved through a private DNS resolver, or an equivalent service.

Within cloud environments, a hub VPC may want to access a bucket through its private endpoint that is resolvable through a private resource record with a wildcard hostname. For example, "bucket1.us-south.s3.mycloud.internal" may be resolvable through a resource record with name "*.us-south.s3.mycloud.internal." When workloads on the hub's VPC are to access a bucket's endpoint, the hub VPC can resolve the private wildcard hostname to a private address for its own VPE gateway on its subnet. The hub VPC may send DNS query traffic to a gateway leading out of the hub VPC, to a private DNS resolver. The private DNS resolver may, in some approaches, understand that the DNS query originated from the VPC's internal network gateway, and thereby, the DNS resolver would then resolve the DNS query using that hub VPC's private zone of resource records.

There are at least two issues encountered within the setup described above that compromise performance and efficiency of cloud networks when spoke VPCs are involved. A first of these issues concerns scalability and general traffic throughput. For example, the workload on a spoke VPC may need to access a bucket of the same VPE name. In some approaches, in order to achieve the access, the spoke may forward the DNS query for the VPE name to a hub VPC. The hub VPC may perform a DNS resolution that includes attempting to resolve to a VPE gateway on the hub VPC. As the number of spoke VPCs with workload that need to access this one VPE gateway grows, the more congested the traffic may become. At some point, the VPE gateway may no longer be able to handle data loads for all of these hubs. Even if the spoke VPC needs to access different VPE gateways, the DNS resolution may still be performed through the hub VPC and the hub VPC's gateway to the cloud internal network to private DNS resolvers, or an equivalent service on the cloud. This may resolve to an IP address of a different VPE gateway on the hub VPC. However, this still means that traffic will still need to flow from all spokes to the one hub, resulting in the same capacity concerns.

The other issue mentioned above is based on situations in which every hub and/or spoke VPC's VPE endpoint is implemented through a private resource record of the same wildcard hostname, e.g., *.us-south.s3.mycloud.internal, each under a different private DNS zone for a given VPC, e.g., one us-south.s3.mycloud.internal private zone the hub VPC and one for each spoke VPC. The private resource record used should be one under the VPC's private zone of the workload making the query. If not, a name collision is likely to occur which compromises performance of the network environment and, in some approaches, results in user devices being unable to access data and/or incorrect data being made accessible to user devices. Furthermore, because of these name collisions, it may not be possible to determine which private zone or resource record is the correct one to use.

In sharp contrast to the deficiencies noted in the issued described above, the techniques of various embodiments and approaches described herein improve performance and efficiency of cloud networks. These improvements are enabled by creating a VPE for the service endpoints for each of their owning VPCs, whether a given VPC is acting as either a hub or a spoke. A bucket is created with a name containing at least the VPC ID of the VPC that should have access to the bucket, and may contain additional descriptive details about the bucket. Thereafter, in response to a determination that a DNS query for that name is sent either from spoke to the hub, or from the hub itself, the DNS query is able to eventually reach a private DNS resolver. This resolver is enabled, as a result of the techniques described herein, to understand that the DNS query falls into this unique scenario and is caused to parse the hostname to extract the VPC ID to use as the context. From this context, the endpoint hostname is resolved using the VPE resource record of the zone owned by the VPC that originally sent the request.

Figure 3:
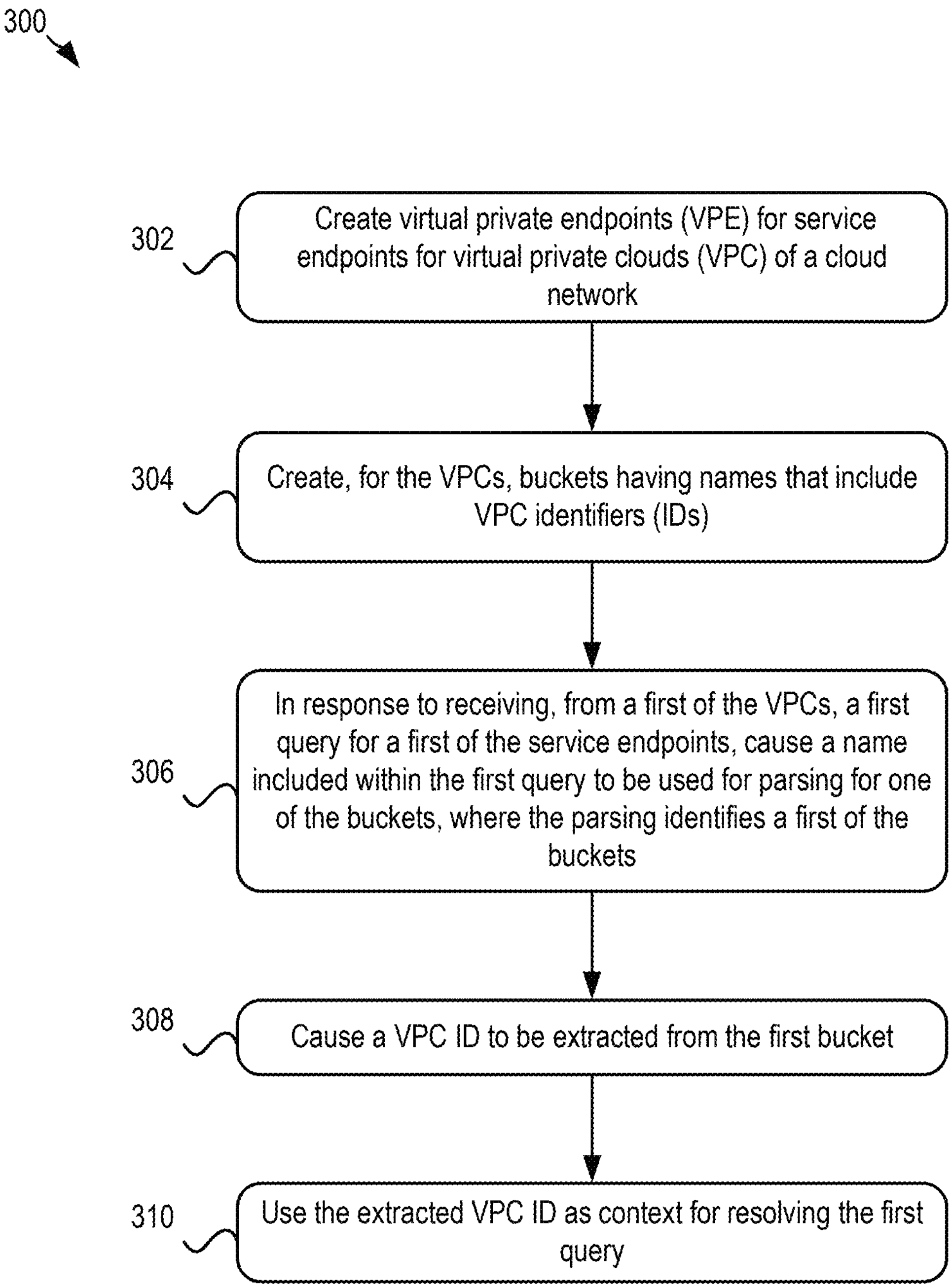
FIG. 3 is a flowchart of a method, in accordance with one embodiment of the present invention.

Now referring to FIG. 3, a flowchart of a method 300 is shown according to one embodiment. The method 300 may be performed in accordance with aspects of the present invention in any of the environments depicted in FIGS. 1-6, among others, in various embodiments. Of course, more or fewer operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Operation 302 includes creating VPEs for service endpoints for VPCs of a cloud network. As mentioned elsewhere above, in some approaches, the endpoints may be S3 endpoints. Furthermore, in some approaches, the cloud network may include a plurality of VPCs, and therefore a plurality of VPEs may be created. The VPCs may be of a type that would become apparent to one of ordinary skill in the art after reading the descriptions herein. For example, in some approaches, the VPCs include one or more hubs. In some other approaches, the VPCs may additionally and/or alternatively include one or more spokes.

In some approaches, the VPEs are automatically created. In some other approaches, the VPEs may additionally and/or alternatively be created in response to receiving a request to create the VPE, e.g., from a user device, from one of the VPCs, etc.

Method 300 may additionally and/or alternatively include creating one or more buckets, where the buckets are logical containers that data may be stored in. For example, operation 304 includes creating, for the VPCs, buckets having names that include at least VPC identifiers (IDs) to thereafter be used for fulfilling queries. Illustrative techniques that may provide context for the creation of buckets described herein are provided below.

In some approaches, the buckets may be created in a predetermined format. For example, in one of such approaches, a bucket name format may include an alphanumeric format with dot and dash of 22 char><dash><VPC ID 41 char>. This creation may additionally and/or alternatively include creation of a plurality of VPEs for a plurality of spoke VPCs, e.g., an S3 VPE may be created for spoke VPCs 1 to 5 in response to receiving a request from a user device associated with a spoke VPC owner of user data. This creation may additionally and/or alternatively include creation of a VPE for a hub VPC, e.g., an S3 VPE may be created for a hub VPC in response to receiving a request from a user device associated with a hub VPC owner of user data. In one illustrative example, a user device may enable DNS resolution through the hub for one of the VPEs. For example, for a spoke VPC of ID r006-1a2dccdd-68b0-481c-be7d-42f4c2ac3209, the DNS resolution may, in some approaches, be enabled through an API call with a VPE service.

In order to configure DNS resolution behavior through the services for the spoke VPCs, method 300 may, in some approaches, additionally and/or alternatively include causing, e.g., instructing, a VPE service to perform an API call to a private DNS service to create internal mapping zones. For context, in some preferred approaches, based on the mapping, the private DNS service is able to hold a private zone for internally mapping a DNS query sent through the hub to an originating VPC's private zones using a VPC ID and zonal affinity. More specifically, in one or more of such approaches, the private DNS resolver resolves the DNS query for the VPE using the requested VPC's private DNS zone (as will be described in greater detail elsewhere below in operations 306-310).

In one illustrative example that details the creation of mapping zones, the VPE service may be caused, e.g., instructed, to make an API call to a private DNS service to create an internal mapping zone having the name cos.vpe-hubspoke.internal.cloud.companyA.com and the hub VPC may be added as a permitted network. In contrast, in approaches in which a mapping zone already exists, this creation step may be skipped for the given zone.

Method 300, in some approaches, includes adding DNS resource records in the zones mentioned above. This step, in some approaches, includes causing the private DNS service to obtain a spoke's VPC's Source Network Address Translation (SNAT) IP addresses in order to perform the addition, e.g., an address of "10.10.10.5, 10.10.30.11, 10.10.40.56". For this illustrative address, the private DNS service may be caused to a series of DNS resource records in above zone (see three illustrative resource records below).

| | | |
|---|---|---|
| r006-1a2dccdd-68b0-481c-be7d-42f4c2ac3209-us-south-1 | A. | 10.10.10.5 |
| r006-1a2dccdd-68b0-481c-be7d-42f4c2ac3209-us-south-2 | A. | 10.10.30.11 |
| r006-1a2dccdd-68b0-481c-be7d-42f4c2ac3209-us-south-3 | A. | 10.10.40.56 |

Various operations described below detail, in some approaches, techniques for accessing the created buckets.

In some approaches, one or more of the VPCs may request access to data stored in one or more of the created buckets. The hub VPC may, in some approaches, have one forwarding component per availability zone that forwards such requests to the private DNS resolver. These requests may specifically, in some approaches, be queries, e.g., domain name system (DNS) queries, for one or more of the endpoints. In one illustrative approach, a DNS query for bucket1-r006-1a2dccdd-68b0-481c-be7d-42f4c2ac3209.s3.us-south.appdomain.cloud may originate from the spoke VPC from a particular availability zone to the forwarding component in the hub VPC of the same availability zone.

In response to receiving, from a first of the VPCs, a first query for a first of the service endpoints, method 300 may include causing a name included within the first query to be used for parsing for one of the buckets, e.g., see operation 306. In some approaches, causing the name included within the first query to be used for parsing for one of the buckets includes instructing a DNS resolver to use the name included within the first query perform the parsing. The resolver, in some preferred approaches, checks the queried name's format to identify whether the formal falls within a scenario that calls for a lookup to be performed to find an associated one of the internal mapping zones. For example, the resolver may be caused, e.g., instructed, to check whether the requestor IP of the DNS query message is from the hub, to ensure that the requestor has access to internal mapping zone. More specifically, in some approaches, the parsing may, in some approaches, be used to identify one of the buckets, e.g., a first of the buckets. For context, at least some of the buckets (and preferably each of the created buckets) contain unique VPC IDs of the VPC that should have access to the bucket. This way, VPCs that should not have access to the bucket are not mistakenly provided access to the bucket (as a result of name collisions otherwise occurring as described elsewhere above).

In response to a determination that a scenario is identified that calls for a lookup to be performed to find an associated one of the internal mapping zones, the resolver may be caused to extract the VPC ID from the qname to use as the context. For example, operation 308 includes causing a VPC ID to be extracted from the identified bucket, e.g., the first bucket. In some approaches, this extraction is only performed in response to a determination that the private DNS resolver has checked and confirmed that the requestor IP of the query message is from the hub, e.g., to ensure that the requestor has access to an internal mapping zone.

Operation 310 includes using the extracted VPC ID as context for resolving the first query. In one illustrative approach, because the DNS query message has a requestor IP of the hub VPC's us-south-1 availability zone service gateway to the internal network, the resolver knows that it needs to also work within the us-south-1 context. The resolver is caused, e.g., instructed to lookup a resource record for FQDN r006-1a2dccdd-68b0-481c-be7d-42f4c2ac3209-us-south-1.cos.vpehubspoke.internal.cloud-.companyA.com. Using the IP address 10.10.10.5, the resolver performs another lookup for the s3 zone created by the VPE owned by the original requestor VPC (whether hub or spoke, but it is a spoke in this case). The resolver may resolve the qualified name (qname) bucket1-r006-1a2dccdd-68b0-481c-be7d-42f4c2ac3209.s3.us-south.appdomain-.cloud using the original requestor's private zone.

As mentioned elsewhere herein, the VPC from which a query originates may, in some approaches, be a spoke, while in some other approaches, be a hub. In some approaches in which the first VPC is a spoke, resolving the first query may include allowing access to a private zone of resource records associated with the extracted VPC ID, where the private zone of resource records is owned by the first VPC. For example, in some approaches, a first of the created internal mapping zones includes the private zone of resource records associated with the extracted VPC ID. Using the extracted VPC ID as context for resolving the first query may, in some approaches, include resolving, utilizing the context, an endpoint hostname utilizing a VPE resource record of a zone owned by the VPC that originally sent the request.

In contrast to some of the approaches described above, the first VPC may be a hub. In some approaches in which the first VPC is a hub, in response to a determination that a private zone of resource records associated with the extracted VPC ID is not found during use of the extracted VPC ID as context for resolving the first query, method 300 may include using the VPE created for the service endpoint associated with the hub to resolve the first query. In other words, in response to a determination that the internal mapping zone is not found, the first query may be resolved using the hub's VPE. It should be noted that, for the internal mapping, in some approaches, while the spoke is creating its VPE, an owner of the spoke can choose an option of linking/connecting this VPE endpoint with the hub. Connecting the spoke's VPE with the hub enables DNS resolution to be relayed through the hub, but the hub does not have visibility to the DNS zone or DNS record underpinning the spoke's VPE. In response to a determination that the VPC ID is not valid, the first query may be resolved using the hub's VPE. Furthermore, in response to a determination that the hub is the original requestor for an endpoint, depending on the VPC ID used in the hostname, the first query resolves to that spoke VPC's VPE.

Figure 4:
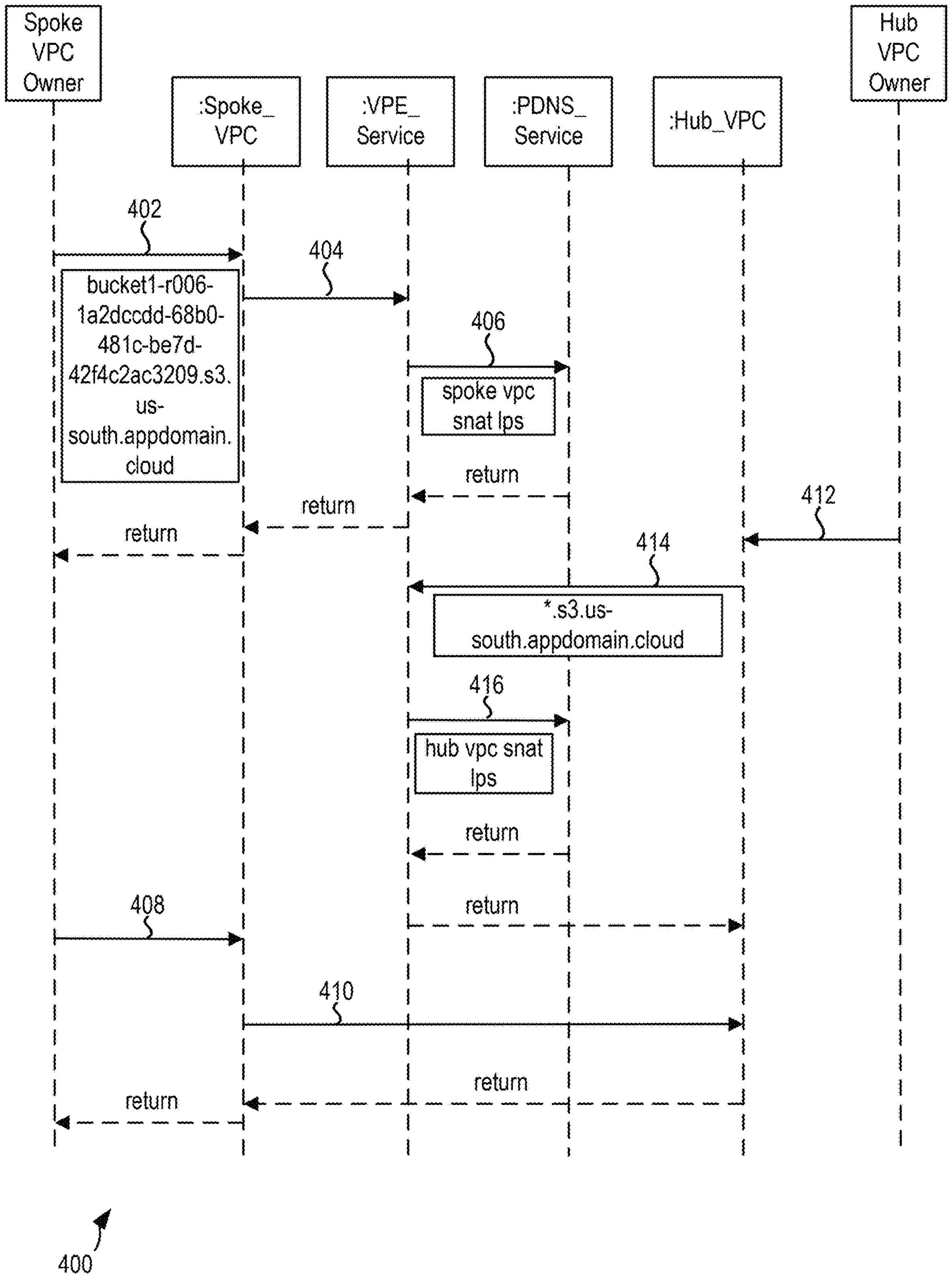
FIG. 4 is a flowchart of a method, in accordance with one embodiment of the present invention.

Now referring to FIG. 4, a flowchart of a method 400 is shown according to one embodiment. The method 400 may be performed in accordance with aspects of the present invention in any of the environments depicted in FIGS. 1-6, among others, in various embodiments. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method X00 may be partially or entirely performed by a processing circuit, or some other device having one or more processors therein. The processor, e.g., processing circuit(s), chip(s), and/or module(s) implemented in hardware and/or software, and preferably having at least one hardware component, may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 400 includes techniques to allow for private hostname DNS resolution for VPCs in a hub and spoke model. More specifically, operations of method 400 may be used to create buckets that each contain unique VPC IDs of the VPC(s) that should have access to it. At least some of these operations may, in some approaches, be caused to be performed by the components shown in FIG. 4 based on instructions being issued, e.g., by a processing circuit, a controller, etc. Such components may include, e.g., a user device that acts as a spoke VPC owner of user data, a user device that acts as a hub VPC owner of user data, a spoke VPC, a VPE service device configured to perform an API call, a protective DNS (PDNS) service device, and a hub VPC.

Operation 402 includes creating a VPE in response to receiving a request from the user device that acts as a spoke VPC owner of user data. A bucket may be created in response thereto, e.g., see bucket1-r006-1a2dccdd-68b0-481c-be7d-42f4c2ac3209.s3.us-south.appdomain.cloud. Operation 404 includes creating a VPE for the bucket. Furthermore, a resource record may be created for the bucket, e.g., using a create glb/resource-records operation 406. Returns may be relayed to the user device that acts as a spoke VPC owner of user data, in some approaches, e.g., see several "return" operations return to the Spoke VPC Owner.

In response to receiving, from the Spoke VPC Owner, a DNS first query (see operation 408) for a first of the service endpoints, a name included within the first query to be used for parsing for one of the buckets. For example, the first query may include a POST/share_bindings and specify a {<HubID>}. In operation 410, the POST/share_bindings query is relayed to the HUB_VPC and parsing is performed using {<SpokeID, Sb1>}.

In contrast to several approaches above, in some approaches, a VPE may be created in response to receiving a request from the user device that acts as a hub VPC owner of user data, e.g., see request operation 412 and creation operation 414. A resource record may be created using a create glb/resource-records operation 416, and returns may be relayed to the hub VPC.

Figure 5:
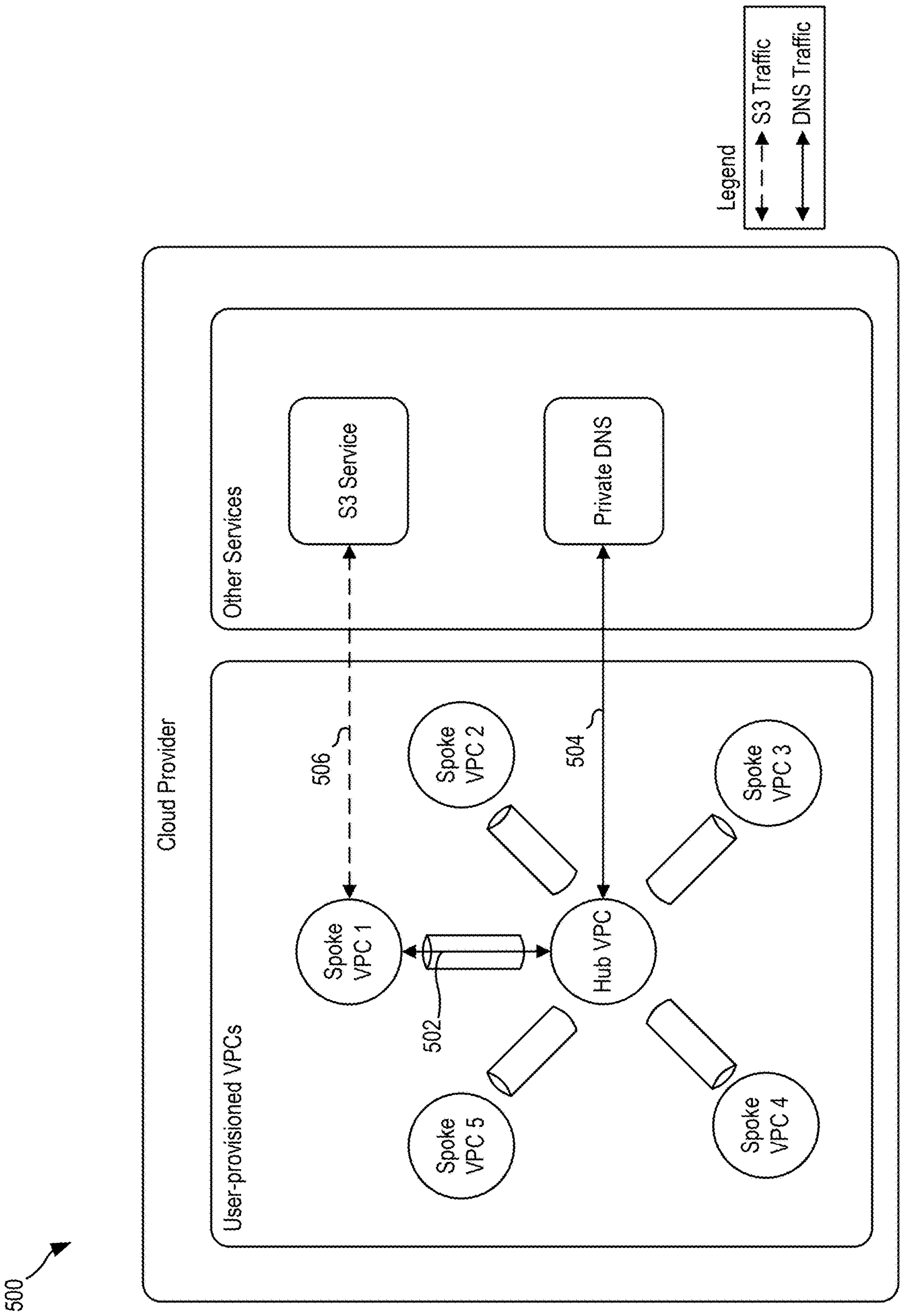
FIG. 5 is a diagram of a cloud network, in accordance with one embodiment of the present invention.

FIG. 5 depicts a cloud network 500, in accordance with one embodiment. As an option, the present cloud network 500 may be implemented in conjunction with features from any other embodiment listed herein, such as those described with reference to the other FIGS. Of course, however, such cloud network 500 and others presented herein may be used in various applications and/or in permutations which may or may not be specifically described in the illustrative embodiments listed herein. Further, the cloud network 500 presented herein may be used in any desired environment.

FIG. 5 depicts a spoke accessing an S3 bucket in the cloud network 500. The cloud network includes a plurality of spoke VPCs, e.g., see Spoke VPC1, Spoke VPC2, Spoke VPC3, Spoke VPC4, and Spoke VPC5, and a hub VPC of a user-provisioned VPCs portion of a cloud provider of the cloud network. Other services of the cloud provider includes an S3 service and private DNS.

The spoke's access of an S3 bucket may, in some approaches, include a first query being sent from the Spoke VPC1 to the Hub VPC, e.g., see operation 502, which is then relayed by the Hub VPC to the private DNS, e.g., see operation 504. In some approaches, a name included within the first query to be used for parsing for a bucket that the Spoke VPC 1 is authorized to access. In order to further clarify how authorized access to the originating VPC's private DNS zone that underpins the originating VPC's VPE endpoint works, an example may be considered. In such an example, a spoke sends a DNS query through the hub, and the query arrives at the DNS resolver. There may also be (internal) zones only accessible to the hub, of a special type, used to hold DNS resource records. The internal resource records in this internal zone is accessible only to the hub, and allows for the conversion between a spoke VPC's ID to the SNAT IPs of said spoke VPC. In some approaches, each internal resource record also notes the availability zone location for the SNAT IP it is representing. The DNS resolver may perceive the DNS query as coming from the hub VPC, and the DNS resolver parses the queried hostname for the originating VPC ID, which is the spoke VPC ID in this example. The DNS resolver looks for internal zones within the set of zones that only the hub VPC has access to and visibility to. The DNS resolver sees that there is an internal zone for that spoke VPC ID, in some approaches, and furthermore may find the internal resource records that provides the SNAT IPs of the spoke VPC ID. The DNS resolver then chooses the internal resource record that also matches the availability zone location specified in the hostname of the DNS query. The DNS resolver may then be caused to perform a context switch using the SNAT IP of the spoke VPC of the availability zone location specified in the hostname in the DNS query. This transaction, in order to resolve the DNS query, is then allowed access and visibility to the spoke VPC's set of zones. The DNS resolver, in some approaches, searches in the spoke VPC's set of zones to find the resource record for the VPE hostname that was queried, then responds back to the hub VPC with the DNS response that contains the address of the spoke VPC's s3 VPE endpoint. The hub VPC proxies this back to the spoke VPC, and the resource within the spoke VPC receives this DNS answer, and in response thereto, connects to the VPE endpoint for the spoke VPC at the specified availability zone location.

The parsing described above may, in some approaches, be performed by the private DNS and a VPC ID may be extracted from an identified bucket. The VPC ID may be used as context for resolving the first query. More specifically, the VPC ID may reveal that the Spoke VPC 1 is authorized to access user data associated with the first query. This access may thereafter be performed based on this context, e.g., see operation 506.

Figure 6:
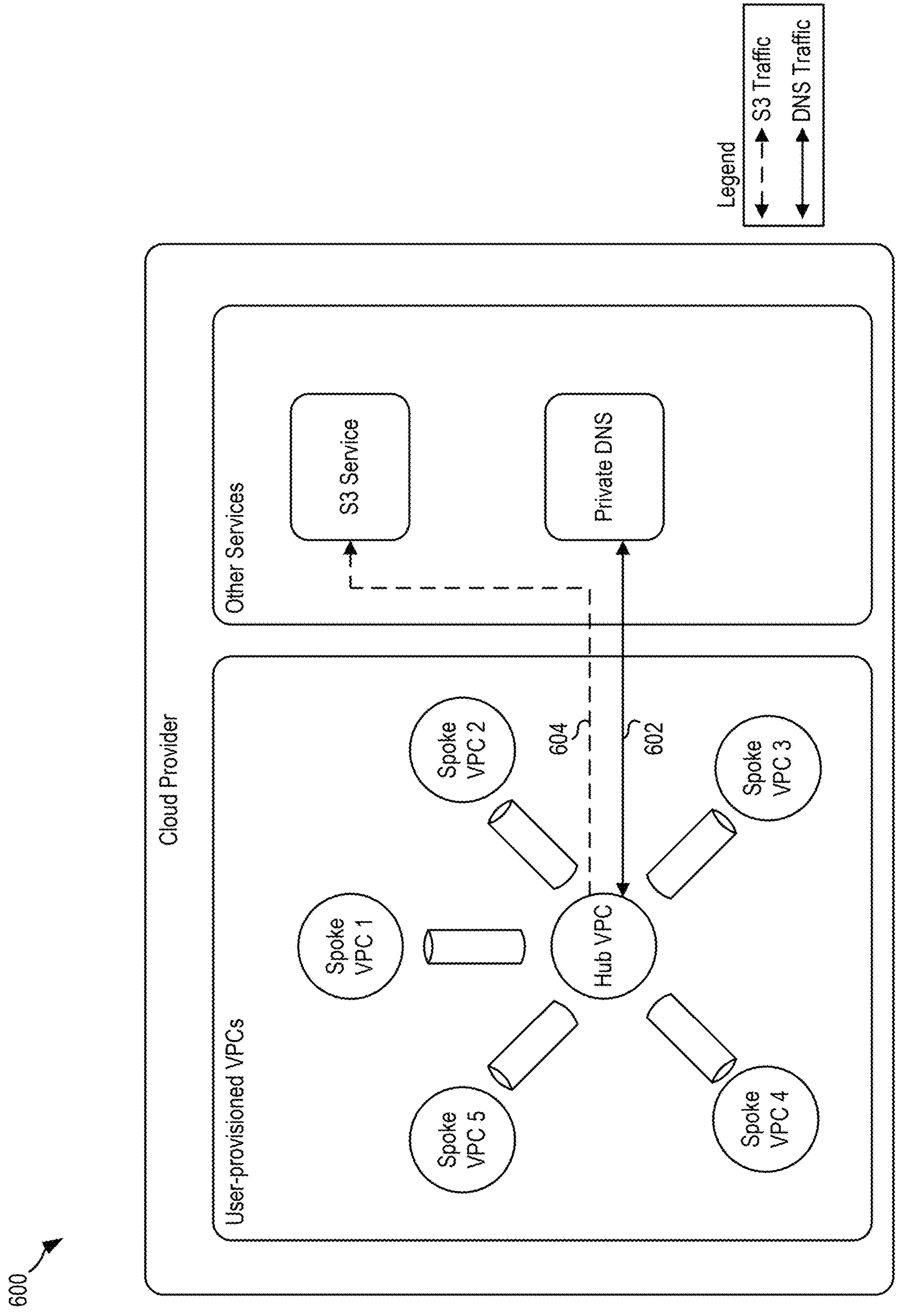
FIG. 6 is a diagram of a cloud network, in accordance with one embodiment of the present invention.

FIG. 6 depicts a cloud network 600, in accordance with one embodiment. As an option, the present cloud network 600 may be implemented in conjunction with features from any other embodiment listed herein, such as those described with reference to the other FIGS. Of course, however, such cloud network 600 and others presented herein may be used in various applications and/or in permutations which may or may not be specifically described in the illustrative embodiments listed herein. Further, the cloud network 600 presented herein may be used in any desired environment.

FIG. 6 depicts a hub accessing an S3 bucket in the cloud network 600. The cloud network includes a plurality of spoke VPCs, e.g., see Spoke VPC1, Spoke VPC2, Spoke VPC3, Spoke VPC4, and Spoke VPC5, and a hub VPC of a user-provisioned VPCs portion of a cloud provider of the cloud network. Other services of the cloud provider includes an S3 service and private DNS.

The hub's access of an S3 bucket may, in some approaches, include a first query being sent from the Hub VPC to the private DNS, e.g., see operation 602. In some approaches, a name included within the first query to be used for parsing for a bucket that the Hub VPC 1 is authorized to access. This parsing may be performed by the private DNS and a VPC ID may be extracted from an identified bucket. The VPC ID may be used as context for resolving the first query. More specifically, the VPC ID may reveal that the Hub VPC is authorized to access user data associated with the first query. This access may thereafter be performed based on this context, e.g., see operation 604.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method (CIM), the CIM comprising:

creating virtual private endpoints (VPEs) for service endpoints for virtual private clouds (VPCs) of a cloud network, wherein the VPCs include hubs and/or spokes;

creating, for the VPCs, buckets having names that include VPC identifiers (IDs);

in response to receiving, from a first of the VPCs, a first query for a first of the service endpoints, causing a name included within the first query to be used for parsing for one of the buckets, wherein the parsing identifies a first of the buckets;

causing a VPC ID to be extracted from the first bucket;

using the extracted VPC ID as context for resolving the first query, wherein the first VPC is a spoke, wherein resolving the first query includes allowing access to a private zone of resource records associated with the extracted VPC ID; and causing a VPE service to perform an API call to a private domain name system (DNS) service to create internal mapping zones, wherein a first of the internal mapping zones includes the private zone of resource records associated with the extracted VPC ID, wherein the first query is a domain name system (DNS) query, wherein the VPC IDs are unique from one another and are the VPC IDs of the VPC that is allowed to access the buckets, wherein the private zone of resource records associated with the extracted VPC ID is owned by the first VPC, wherein the using the extracted VPC ID as context for resolving the first query includes resolving, utilizing the context, an endpoint hostname utilizing a first of the resource records, wherein the first resource record is of a zone owned by the first VPC that originally sent the first query, wherein a second of the VPCs is a hub, wherein the private DNS service holds a private zone, that includes the private zone of resource records associated with the extracted VPC ID, for internally mapping DNS queries sent through the hub to originating VPC's private zones; and using zonal affinity to resolve the first query.

2. The CIM of claim 1, the CIM comprising: in response to a determination that a private zone of resource records associated with the extracted VPC ID is not found, using the VPE created for the service endpoint associated with a first of the hubs to resolve the first query.

3. The CIM of claim 1, wherein causing the name included within the first query to be used for parsing for one of the buckets includes instructing a domain name system (DNS) resolver to use the name included within the first query perform the parsing, and comprising: causing the DNS resolver to check a format of the name to identify whether the format falls within a scenario that calls for a lookup to be performed to find an associated one of the internal mapping zones, wherein the scenario comprises an internet protocol (IP) of the first VPC that sent the first query is from the spoke to the hub to ensure that the first VPC that sent the first query has access to a first of the internal mapping zones; and in response to a determination that the format falls within the scenario, causing the DNS resolver to perform the lookup, wherein the private zone of resource records associated with the extracted VPC ID is identified based on performing the lookup, wherein the internal mapping zones have names that include a company name, wherein the VPEs are created in response to receiving, from the first VPC, a request to create the VPEs, wherein the buckets are logical containers configured to store data, wherein the bucket names additionally include an alphanumeric format with dots and dashes within the names, wherein the hub has unique forwarding components for the internal mapping zones, wherein a first of the forwarding components is used to send the first query to the DNS resolver.

4. A computer program product (CPP), the CPP comprising:

a set of one or more computer-readable storage media; and program instructions, collectively stored in the set of one or more storage media, for causing a processor set to perform the following computer operations:

create virtual private endpoints (VPEs) for service endpoints for virtual private clouds (VPCs) of a cloud network, wherein the VPCs include hubs and/or spokes;

create, for the VPCs, buckets having names that include VPC identifiers (IDs);

in response to receiving, from a first of the VPCs, a first query for a first of the service endpoints, cause a name included within the first query to be used for parsing for one of the buckets, wherein the parsing identifies a first of the buckets;

cause a VPC ID to be extracted from the first bucket;

use the extracted VPC ID as context for resolving the first query, wherein the first VPC is a spoke, wherein resolving the first query includes allowing access to a private zone of resource records associated with the extracted VPC ID;

cause a VPE service to perform an API call to a private domain name system (DNS) service to create internal mapping zones, wherein a first of the internal mapping zones includes the private zone of resource records associated with the extracted VPC ID, wherein the first query is a domain name system (DNS) query, wherein the VPC IDs are unique from one another and are the VPC IDs of the VPC that is allowed to access the buckets, wherein the private zone of resource records associated with the extracted VPC ID is owned by the first VPC, wherein the using the extracted VPC ID as context for resolving the first query includes resolving, utilizing the context, an endpoint hostname utilizing a first of the resource records, wherein the first resource record is of a zone owned by the first VPC that originally sent the first query, wherein a second of the VPCs is a hub, wherein the private DNS service holds a private zone, that includes the private zone of resource records associated with the extracted VPC ID, for internally mapping DNS queries sent through the hub to originating VPC's private zones; and use zonal affinity to resolve the first query.

5. The CPP of claim 4, the CPP comprising: program instructions, collectively stored in the set of one or more storage media, for causing the processor set to perform the following computer operations: in response to a determination that a private zone of resource records associated with the extracted VPC ID is not found, use the VPE created for the service endpoint associated with a first of the hubs to resolve the first query.

6. The CPP of claim 4, wherein causing the name included within the first query to be used for parsing for one of the buckets includes instructing a domain name system (DNS) resolver to use the name included within the first query perform the parsing, and the CPP comprising: program instructions, collectively stored in the set of one or more storage media, for causing the processor set to perform the following computer operations: cause the DNS resolver to check a format of the name to identify whether the format falls within a scenario that calls for a lookup to be performed to find an associated one of the internal mapping zones, wherein the scenario comprises an internet protocol (IP) of the first VPC that sent the first query is from the spoke to the hub to ensure that the first VPC that sent the first query has access to a first of the internal mapping zones; and in response to a determination that the format falls within the scenario, cause the DNS resolver to perform the lookup, wherein the private zone of resource records associated with the extracted VPC ID is identified based on performing the lookup, wherein the internal mapping zones have names that include a company name, wherein the VPEs are created in response to receiving, from the first VPC, a request to create the VPEs, wherein the buckets are logical containers configured to store data, wherein the bucket names additionally include an alphanumeric format with dots and dashes within the names, wherein the hub has unique forwarding components for the internal mapping zones, wherein a first of the forwarding components is used to send the first query to the DNS resolver.

7. A computer system (CS), the CS comprising:

a processor set;

a set of one or more computer-readable storage media; and program instructions, collectively stored in the set of one or more storage media, for causing the processor set to perform the following computer operations:

create virtual private endpoints (VPEs) for service endpoints for virtual private clouds (VPCs) of a cloud network, wherein the VPCs include hubs and/or spokes;

create, for the VPCs, buckets having names that include VPC identifiers (IDs);

in response to receiving, from a first of the VPCs, a first query for a first of the service endpoints, cause a name included within the first query to be used for parsing for one of the buckets, wherein the parsing identifies a first of the buckets;

cause a VPC ID to be extracted from the first bucket;

use the extracted VPC ID as context for resolving the first query, wherein the first VPC is a spoke, wherein resolving the first query includes allowing access to a private zone of resource records associated with the extracted VPC ID, wherein the first query is a domain name system (DNS) query, wherein the VPC IDs are unique from one another and are the VPC IDs of the VPC that is allowed to access the buckets, wherein the private zone of resource records associated with the extracted VPC ID is owned by the first VPC, wherein the using the extracted VPC ID as context for resolving the first query includes resolving, utilizing the context, an endpoint hostname utilizing a first of the resource records, wherein the first resource record is of a zone owned by the first VPC that originally sent the first query, wherein a second of the VPCs is a hub, wherein a private DNS service holds a private zone, that includes the private zone of resource records associated with the extracted VPC ID, for internally mapping DNS queries sent through the hub to originating VPC's private zones;

use zonal affinity to resolve the first query; and cause a VPE service to perform an API call to the private DNS service to create internal mapping zones, wherein a first of the internal mapping zones includes the private zone of resource records associated with the extracted VPC ID.

8. The CS of claim 7, the CS comprising: program instructions, collectively stored in the set of one or more storage media, for causing the processor set to perform the following computer operations: in response to a determination that a private zone of resource records associated with the extracted VPC ID is not found, use the VPE created for the service endpoint associated with a first of the hubs to resolve the first query.

9. The CS of claim 7, wherein causing the name included within the first query to be used for parsing for one of the buckets includes instructing a domain name system (DNS) resolver to use the name included within the first query perform the parsing, and the CS comprising: program instructions, collectively stored in the set of one or more storage media, for causing the processor set to perform the following computer operations: cause the DNS resolver to check a format of the name to identify whether the format falls within a scenario that calls for a lookup to be performed to find an associated one of the internal mapping zones, wherein the scenario comprises an internet protocol (IP) of the first VPC that sent the first query is from the spoke to the hub to ensure that the first VPC that sent the first query has access to the first internal mapping zone; and in response to a determination that the format falls within the scenario, cause the DNS resolver to perform the lookup, wherein the private zone of resource records associated with the extracted VPC ID is identified based on performing the lookup, wherein the internal mapping zones have names that include a company name, wherein the VPEs are created in response to receiving, from the first VPC, a request to create the VPEs, wherein the buckets are logical containers configured to store data, wherein the bucket names additionally include an alphanumeric format with dots and dashes within the names, wherein the hub has unique forwarding components for the internal mapping zones, wherein a first of the forwarding components is used to send the first query to the DNS resolver.

* * * * *